US008259740B2

(12) United States Patent
Li et al.

(10) Patent No.: US 8,259,740 B2
(45) Date of Patent: Sep. 4, 2012

(54) METHOD AND AN APPARATUS FOR PROCESSING PACKETS

(75) Inventors: Xiao Li, Beijing (CN); Xiangqing Chang, Beijing (CN); Xudong Zou, Beijing (CN)

(73) Assignee: Hangzhou H3C Technologies Co., Ltd., Hangzhou, Zhejiang Province (CN)

( * ) Notice: Subject to any disclaimer, the term of this patent is extended or adjusted under 35 U.S.C. 154(b) by 220 days.

(21) Appl. No.: 12/808,426

(22) PCT Filed: Jun. 12, 2008

(86) PCT No.: PCT/CN2008/071281
§ 371 (c)(1),
(2), (4) Date: Jun. 16, 2010

(87) PCT Pub. No.: WO2009/079933
PCT Pub. Date: Jul. 2, 2009

(65) Prior Publication Data
US 2010/0322239 A1    Dec. 23, 2010

(30) Foreign Application Priority Data
Dec. 20, 2007   (CN) .......................... 2007 1 0301935

(51) Int. Cl.
*H04L 12/56* (2006.01)
(52) U.S. Cl. .................... 370/419; 370/463; 709/250
(58) Field of Classification Search .................. None
See application file for complete search history.

(56) References Cited

U.S. PATENT DOCUMENTS

| 5,896,499 A * | 4/1999 | McKelvey ...................... 726/11 |
| 6,999,454 B1 * | 2/2006 | Crump .......................... 370/389 |
| 7,680,066 B2 * | 3/2010 | Zhong .......................... 370/254 |
| 7,869,442 B1 * | 1/2011 | Kamboh et al. ............... 370/400 |
| 8,020,200 B1 * | 9/2011 | Krohn et al. ..................... 726/11 |
| 2003/0202513 A1 | 10/2003 | Chen et al. |
| 2003/0231649 A1 * | 12/2003 | Awoseyi et al. .............. 370/463 |
| 2006/0015715 A1 | 1/2006 | Anderson |
| 2006/0123481 A1 * | 6/2006 | Bhatnagar et al. ............... 726/24 |

(Continued)

FOREIGN PATENT DOCUMENTS

CN    1411208 A    4/2003

(Continued)

OTHER PUBLICATIONS

International Search Report: PCT/CN2008/071281.

(Continued)

*Primary Examiner* — Hassan Phillips
*Assistant Examiner* — Duc Duong
(74) *Attorney, Agent, or Firm* — Ladas & Parry LLP

(57) ABSTRACT

The present invention discloses a packet processing method, which applies to a high-performance and scalable flow processing system architecture. The service board performs security processing for packets received from external devices by using the firewall function before sending them to the main CPU; similarly, the service board also performs security processing for packets sent from the main CPU by using the firewall function before the main CPU sends them to external devices. The methods of the present invention utilize high performance and good scalability of the new architecture. In a network with heavy and high-speed traffic, the service board performs security processing for packets by using the firewall function and then transmits the valid packets to the main CPU. Thus, the main CPU is protected by the firewall function against attack packets.

13 Claims, 3 Drawing Sheets

U.S. PATENT DOCUMENTS

| | | |
|---|---|---|
| 2008/0163356 A1* | 7/2008 | Won-Jip et al. .................. 726/13 |
| 2010/0226369 A9* | 9/2010 | Havemann et al. ............ 370/392 |
| 2011/0299419 A1* | 12/2011 | Fendick et al. ............... 370/252 |

FOREIGN PATENT DOCUMENTS

| | | |
|---|---|---|
| CN | 1767495 A | 5/2006 |
| CN | 1832450 A | 9/2006 |
| CN | 101202756 A | 6/2008 |
| EP | 0909692 B1 | 2/2005 |
| KR | 10-0725910 B1 | 6/2007 |

OTHER PUBLICATIONS

Lin Zhang, et al; "Distributed Processing Research and Realization of $3^{rd}$ Tier Message Forwarding in Exchange", Railway Signalling & Communication, Dec. 2006, vol. 42, No. 12, pp. 56-59 abstract attached.

* cited by examiner

METHOD AND AN APPARATUS FOR PROCESSING PACKETS

TECHNICAL FIELD

The present invention relates in general to the field of communication, and more particular to a method and an apparatus for processing packets.

BACKGROUND OF THE INVENTION

The development of network technologies, especially the generation of 10 Gigabit Ethernet poses increasingly higher requirements on Layer 4 through Layer 7 processing performance of network security devices. To this end, a high-performance and scalable flow processing system architecture was introduced, as shown in FIG. 1. However, how to ensure the security of the main CPU and thus ensure the security of the internal network is an urgent problem for the architecture.

The main CPU of an existing switch or router processes the packets received by an interface of the main board as follows: The interface directly sends a received packet to the main CPU of the local main board through the interface processing unit, and the main CPU sends out the packet through an interface of the main board.

The high-performance and scalable flow processing system architecture can also implement main CPU communication by using the above solutions provided by the existing switches or routers. This method features simple implementation and high processing performance in packet receiving and transmitting. However, when this method is applied to security products, especially to the high-end security products in the 10 Gigabit Ethernet networks, the main CPU may be attacked by heavy and high-speed traffic. Therefore, the existing technical solutions cannot ensure the security of the main CPU. A new packet receiving and transmitting solution is in demand for the high-performance and scalable flow processing system architecture.

SUMMARY OF THE INVENTION

The present invention provides a packet processing method, which applies to a high-performance and scalable flow processing system architecture, and enhances the security performance of the system architecture.

To achieve this, the method includes the following steps:

an interface of a main board sending a packet received from an external device to a service board for security processing, and then the service board sending the processed packet to the main CPU;

the main CPU sending a processed reverse packet to the service board, and the service board processing and sending the processed reverse packet to the external device through the interface.

The service board sending the processed packet to the main CPU further includes the following steps:

the service board notifies each interface and/or the main CPU that it will process the packet and corresponding reverse packet.

The service board notifying each interface and/or the main CPU that the service board will process the packet and the reverse packet includes:

the service board sending to each interface and/or the main CPU a flow table, which indicates that the service board will process the packet and the corresponding reverse packet; and/or the service board saving relevant information of the service board in an extension data field of the packet that will be sent to the main CPU, indicating that the service board will process the packet and the corresponding reverse packet.

The main CPU sending the processed reverse packet to the service board includes the following steps:

the main CPU searching the flow table of each interface, acquires the service board that will process the reverse packet, and then sends the processed reverse packet to the service board; or the main CPU searching the flow table sent by the service board, acquires the service board that will process the reverse packet, and then sends the processed reverse packet to the service board; or the main CPU translating the relevant information of the service board in the extension data field of the received packet, acquiring the service board that will process the reverse packet, and then sending the processed reverse packet to the service board.

The present invention also provides a packet processing method, which applies to a high-performance and scalable flow processing system architecture, and includes the following steps:

a main CPU sending a packet to a service board for processing, and then the service board sending the processed packet to an external device through an interface;

the interface receiving a reverse packet returned from the external device and destined for the main CPU and sending the reverse packet to the service board, and the service board performing security processing for the reverse packet and sending the processed reverse packet to the main CPU.

After the service board performing the security processing for the reverse packet, the method further includes:

the service board notifying each interface that it will process the packet and the corresponding reverse packet.

The service board notifying each interface that the service board will process the packet and corresponding reverse packet includes:

the service board sending a flow table to each interface, which indicates that the service board will process the packet and the corresponding reverse packet.

The interface receiving the reverse packet returned from the external device and destined for the main CPU and sending the reverse packet to the service board, and the service board performing security processing for the reverse packet and sending the processed reverse packet to the main CPU includes:

the interface receiving the reverse packet returned from the external device and destined for the main CPU and sending the reverse packet to the service board according to the flow table from the service board, and the service board performing security processing for the reverse packet and sending the processed reverse packet to the main CPU.

The service board performing security processing for the reverse packet includes:

performing the security processing for the reverse packet through a flow acceleration and flow control function of the service board to filter out attack packets.

The present invention also provides a packet processing system, which applies to a high-performance and scalable flow processing system architecture and includes:

an interface unit, which receives packets from external devices and destined for a main CPU and sends the packets to the service board for security processing, and sends reverse packets processed by the service board to the external devices;

at least one service board, which performs the security processing for the packets from the interface unit and sends the processed packets to the main CPU, and processes the reverse packets from the main CPU and then sends the processed reverse packets to the interface unit;

the main CPU, which processes the packets sent from the service board and sends the reverse packets to the service board which processes and sends the reverse packets to the external devices through the interface unit.

The service board includes:

a flow table sending unit, which sends a flow table to each interface and/or to the main CPU to indicate that the service board will process the packets and the corresponding reverse packets; and/or an identification sending unit, which saves the information of the service board in the extension data field of the packet that will be sent to the main CPU.

The main CPU includes:

a service board acquisition unit, which searches the flow table of each interface, and/or the flow table sent to the main CPU and acquires the service board that will process the reverse packets.

The main CPU further includes: a service board acquisition unit, which translates the information of the service board in the extension data fields of the received packets and acquires the service board that will process the reverse packets.

The present invention also provides a packet processing system, which applies to a high-performance and scalable flow processing system architecture and includes:

a main CPU, which sends packets to a service board for processing when intending to send the packets to external devices, and receives reverse packets from the service board;

at least one service board, which processes the packets from the main CPU and sends the processed packets to the external device through an interface, and performs security processing for the reverse packets from an interface and sends the processed reverse packets to the main CPU;

the interface, which sends the processed packets from the service board to the external devices, and sends the reverse packets from the external devices and destined for the main CPU to the service board.

The service board includes:

a flow table sending unit, which sends a flow table to each interface to indicate that the service board will process the packets and the corresponding reverse packets.

The interface includes:

a service board sending unit, which acquires the service board that will process the reverse packets by searching the flow tables when receiving packets from external devices.

Compared to the existing technologies, the present invention has the following benefits:

The above methods of the present invention utilize high performance and good scalability of the new architecture. In a network with heavy and high-speed traffic, the service boards perform security processing for packets by using the firewall function and then transmit the valid packets to the main CPU. Thus, the main CPU is protected by the firewall against attacks.

DETAILED DESCRIPTION OF THE INVENTION

Figure 1:
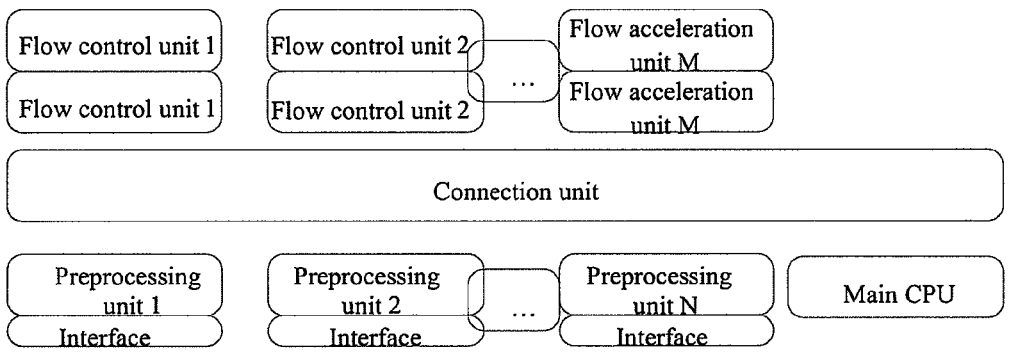
FIG. 1 is a block diagram of the high-performance and scalable flow processing system architecture in the existing technologies.
Figure 2:
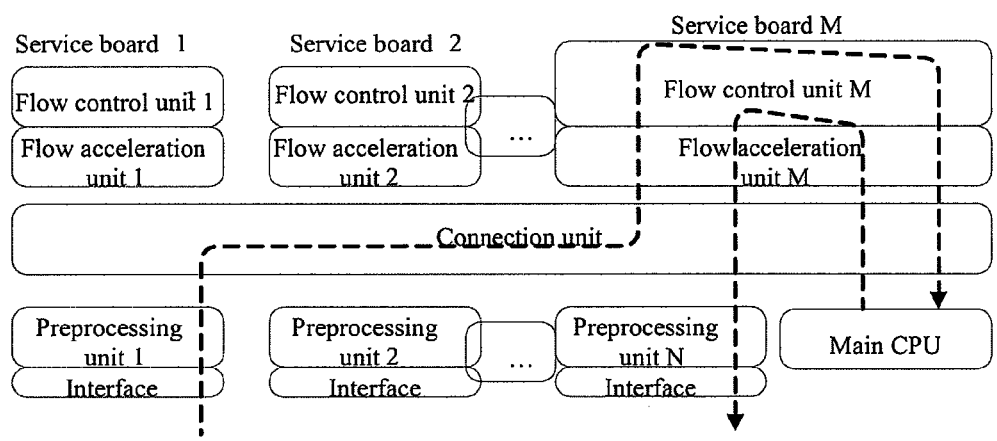
FIG. 2 is a block diagram illustrating the principle of processing a packet in the present invention.

The present invention provides a packet processing method, which applies to the high-performance and scalable flow processing system architecture. The key idea of the method is: the service boards perform security processing for packets received from external devices by using the firewall function before sending them to the main CPU; similarly, the service boards also perform security processing for reverse packets returned from the external devices and destined for the main CPU by using the firewall function before sending them to the main CPU. FIG. 2 shows the principle of the packet processing method. This method protects the main CPU of a security device by using the firewall function.

The following describes the packet processing method of the present invention in details in conjunction with the following embodiments.

Figure 3:
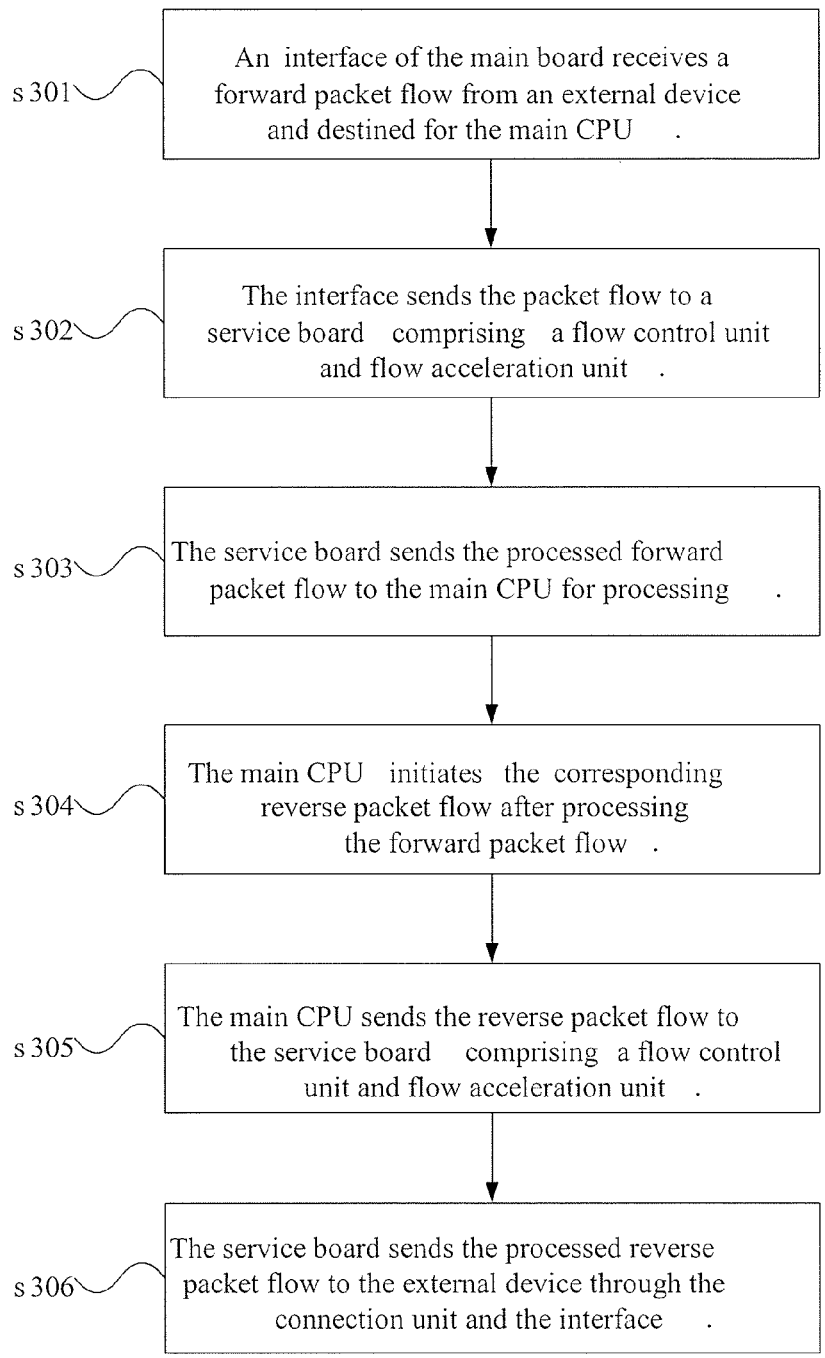
FIG. 3 is a flow chart of sending a packet from an external device to the main CPU in the present invention.

Embodiment 1: FIG. 3 shows the method of processing a packet flow sent from an external device to the main CPU. In this process, the packet flow sent from the external device to the main CPU is a forward packet flow and that sent from the main CPU to the external device is a reverse packet flow. The method comprises the following steps:

At step s301, an interface of the main board receives a forward packet flow from an external device and destined for the main CPU.

At step s302, the interface sends the forward packet flow to a service board comprising a flow control unit and flow acceleration unit.

At this step, the interface sends the forward packet flow to the service board comprising a flow control unit and a flow acceleration unit through the connection unit, rather than to the main CPU directly. Suppose the service board is service board M. How to select a service board (such as service board M) from multiple service boards depends on the load balancing of each service board.

At step s303, the service board sends the processed forward packet flow to the main CPU for processing.

At this step, the flow acceleration and flow control units of service board M perform security processing for the forward packet flow to filter out possible attack packets, and then send the valid packets to the main CPU through the connection unit. The method of detecting and filtering attack packets is configured depending on the packet type.

At step s304, the main CPU initiates the corresponding reverse packet flow after processing the forward packet flow.

At step s305, the main CPU sends the reverse packet flow to the service board comprising a flow control unit and flow acceleration unit.

At this step, the main CPU sends the reverse packet flow to service board M for processing, rather than to the interface directly.

At step s306, service board M sends the processed reverse packet flow to the external device through the connection unit and the interface.

Figure 4:
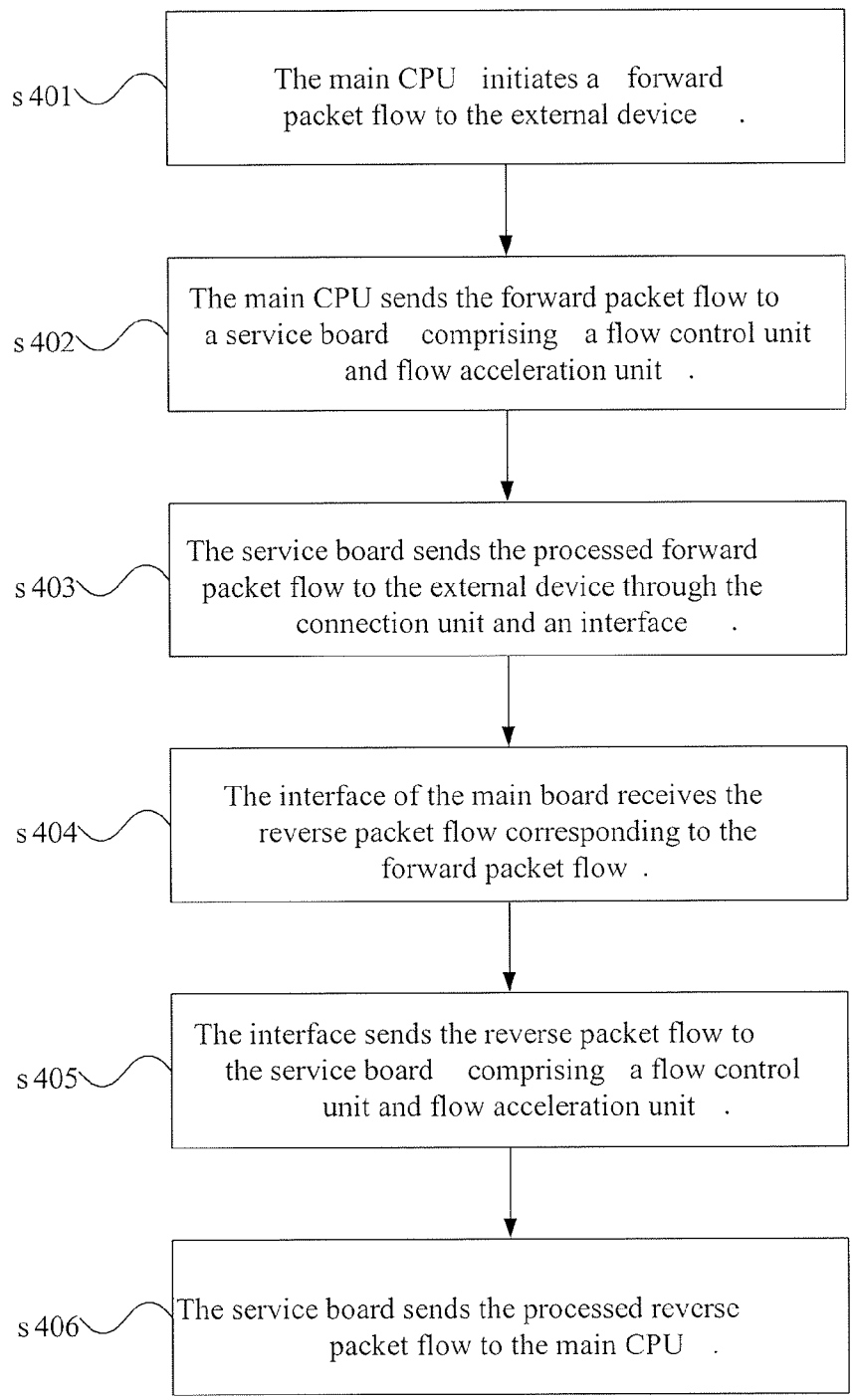
FIG. 4 is a flow chart of sending a packet from the main CPU to an external device in the present invention.

Embodiment 2: FIG. 4 shows the method of processing a packet flow sent from the main CPU to an external device. In this process, the packet flow sent from the main CPU to the external device is a forward packet flow and that sent from the external device to the main CPU is a reverse packet flow. The method comprises the following steps:

At step s401, the main CPU initiates a forward packet flow to the external device.

At step s402, the main CPU sends the forward packet flow to a service board comprising a flow control unit and flow acceleration unit.

At this step, the main CPU does not send the forward packet flow to the external device through the interface of the main board, but to a service board for processing. Suppose the service board is service board M. How to select a service board (such as service board M) from multiple service boards depends on the load balancing of each service board.

At step s403, service board M sends the processed forward packet flow to the external device through the connection unit and the interface.

At step s404, the interface of the main board receives the reverse packet flow corresponding to the forward packet flow.

At step s405, the interface of the main board sends the reverse packet flow to the service board comprising a flow control unit and flow acceleration unit.

At this step, the interface does not send the reverse packet flow directly to the main CPU but to service board M for processing through the connection unit.

At step s406, service board M sends the processed reverse packet flow to the main CPU.

At this step, the flow acceleration and flow control units of service board M perform security processing for the reverse packet flow to filter out possible attack packets, and then send the valid packets to the main CPU through the connection unit. The method of detecting and filtering attack packets is configured depending on the packet type.

As shown in the flow charts of FIG. 3 and FIG. 4, the technical solutions of the present invention, used by the high-performance and scalable flow processing system architecture, require that forward and reverse packet flows be processed on the same service board. To meet this requirement, you must establish a flow table mechanism involving interface, preprocessing unit, and the main CPU. The following describes the flow table mechanism in details in conjunction with the following embodiments:

Embodiment 1: The forward packet flow is the packet flow sent from an external device to the main CPU.

Service board M sends a flow table to the interface and preprocessing unit after processing the forward packet flow to indicate that service board M will process the forward and corresponding reverse packet flows. Then, service board M sends the forward packet flow to the main CPU.

After processing the forward packet flow, the main CPU guarantees that it sends the corresponding reverse packet flow to service board M for processing, in the following ways:

(1) The main CPU searches the flow table of the interface and preprocessing unit to acquire service board M that will process the reverse packet flow; or (2) Service board M also sends a flow table to the main CPU when sending one to the interface and the preprocessing unit. The main CPU saves the flow table. Thus, the main CPU can search the flow table to acquire service board M when intending to send out a reverse packet flow.

(3) Service board M saves some of its information in the extension data field of the forward packet flow that will be sent to the main CPU. When sending the reverse packet flow, the main CPU does not need to save or search the flow table. Instead, the main CPU translates the service board information in the extension data field to acquire service board M.

Embodiment 2: The forward packet flow is the packet flow sent from the main CPU to an external device.

The flow table is empty because it is the main CPU that initiates the packet flow. Failing to find an entry in the flow table, the main CPU selects service board M according to a certain algorithm, and sends the forward packet flow to service board M for processing. Then service board M sends a forward and reverse flow table to the interface and preprocessing unit.

Upon receiving a reverse packet flow from an external device, the preprocessing unit of the interface correctly sends it to service board M according to the reverse flow table. Service board M sends the reverse packet flow to the main CPU after performing security processing for the reverse packet flow. After processing the reverse packet flow, the main CPU can use any method of (1) through (3) in embodiment 1 to acquire the service board that will process the forward packet flow when it sends a forward packet flow later.

The above methods of the present invention utilize high performance and good scalability of the new architecture. In a network with heavy and high-speed traffic, the service boards perform security processing for packets by using the firewall function and then transmit the valid packets to the main CPU. Thus, the main CPU is protected by the firewall against attacks.

The present invention also provides a packet processing system, which applies to a high-performance and scalable flow processing system architecture and comprises:

an interface unit, which receives packets from external devices and destined for the main CPU and sends them to the service board for processing, and sends the reverse packets processed by the service board to the external devices;

at least one service board, which processes packets from the interface unit and sends the processed packets to the main CPU, and processes the reverse packets from the main CPU and then sends them to the interface unit;

main CPU, which processes the packets sent from the service board and sends the reverse packets to the service board (which processes and sends them to the external devices through an interface).

The service board comprises:

a flow table sending unit, which sends a flow table to each interface and/or to the main CPU to indicate that the service board will process the packets and the corresponding reverse packets;

an identification sending unit, which saves the information of a service board in the extension data field of the packet that will be sent to the main CPU.

The main CPU comprises:

a service board acquisition unit, which acquires the service board that will process the reverse packet by using one or multiple of the following ways:

searching the flow table of each interface and acquiring the service board that will process the reverse packet; or searching the flow table sent by the service board and acquiring the service board that will process the reverse packet; or translating the service board information in the extension data field of the received packet and acquiring the service board that will process the reverse packet.

The present invention also provides a packet processing system, which applies to a high-performance and scalable flow processing system architecture and comprises:

main CPU, which sends packets to the service board for processing when intending to send them to external devices, and receives the reverse packets from the service board.

at least one service board, which processes packets received from the main CPU and then sends them to the external device through an interface, and processes the reverse packets received from an interface and sends them to the main CPU;

an interface unit, which sends packets processed by the service board to external devices and sends the reverse packets from the external devices and destined for the main CPU to the service board.

The service board comprises:

a flow table sending unit, which sends a flow table to each interface to indicate that the service board will process the packets and the corresponding reverse packets.

The interface unit comprises:

a service board sending unit, which acquires the service board that will process the reverse packets by searching the flow table when receiving packets from external devices.

The above system of the present invention utilizes high performance and good scalability of the new architecture. In a network with heavy and high-speed traffic, the service boards perform security processing by using the firewall function and then transmit packets to the main CPU. Thus, the main CPU is protected by the firewall function against attacks.

As is apparent, those skilled in the art know clearly the present invention is implemented by using software and necessary general hardware platform. Hardware only is also feasible, but the former mode is better. Concerning this, the technical solutions of the present invention or those contributing to the present invention can be represented by a software product. The software product is stored in a storage media and comprises instructions that enable a device to perform the method described in each embodiment of the present invention.

Although several embodiments of the invention and their advantages are described in details, a person skilled in the art could make various alternations, additions, and omissions without departing from the spirit and scope of the present invention as defined by the appended claims.

What is claimed is:

1. A packet processing method, which applies to a high-performance and scalable flow processing system architecture, comprising:
    an interface of a main board sending a packet received from an external device to a service board for security processing, and then the service board sending the processed packet to the main CPU;
    the main CPU sending a processed reverse packet to the service board, and the service board processing and sending the processed reverse packet to the external device through the interface; wherein
    the service board sending the processed packet to the main CPU comprises:
    notifying each interface and/or the main CPU that the service board will process the packet and the reverse packet by sending to each interface and/or the main CPU a flow table, which indicates that the service board will process the packet and the reverse packet.

2. The method of claim 1, wherein notifying each interface and/or the main CPU that the service board will process the packet and the reverse packet comprises:
    saving relevant information of the service board in an extension data field of the packet that will be sent to the main CPU, indicating that the service board will process the packet and the corresponding reverse packet.

3. The method of claim 2, wherein the main CPU sending the processed reverse packet to the service board comprises:
    the main CPU translating the relevant information of the service board in the extension data field of the received packet, acquiring the service board that will process the reverse packet, and then sending the processed reverse packet to the service board.

4. The method of claim 1, wherein the main CPU sending the processed reverse packet to the service board comprises:
    the main CPU searching the flow table of each interface, and / or the flow table sent to the main CPU by the service board, acquiring the service board that will process the reverse packet, and then sending the processed reverse packet to the service board.

5. A packet processing method, which applies to a high-performance and scalable flow processing system architecture, comprising the following steps:
    a main CPU sending a packet to a service board for processing, and then the service board sending the processed packet to an external device through an interface;
    the interface receiving a reverse packet returned from the external device and destined for the main CPU and sending the reverse packet to the service board, and the service board performing security processing for the reverse packet, notifying each interface that the service board will process the packet and corresponding reverse packet by sending a flow table to each interface, which indicates that the service board will process the packet and the corresponding reverse packet and sending the processed reverse packet to the main CPU.

6. The method of claim 5, wherein the interface receiving the reverse packet returned from the external device and destined for the main CPU and sending the reverse packet to the service board, and the service board performing security processing for the reverse packet and sending the processed reverse packet to the main CPU comprises:
    the interface receiving the reverse packet returned from the external device and destined for the main CPU and sending the reverse packet to the service board according to the flow table from the service board, and the service board performing security processing for the reverse packet and sending the processed reverse packet to the main CPU.

7. The method of claim 5, wherein the service board performing security processing for the reverse packet comprises:
    performing the security processing for the reverse packet through a flow acceleration and flow control function of the service board to filter out attack packets.

8. A packet processing system, which applies to a high-performance and scalable flow processing system architecture, comprising:
    an interface unit, which receives packets from external devices and destined for a main CPU and sends the packets to the service board for security processing, and sends reverse packets processed by the service board to the external devices;
    at least one service board, which performs the security processing for the packets from the interface unit and sends the processed packets to the main CPU, and processes the reverse packets from the main CPU and then sends the processed reverse packets to the interface unit;
    the main CPU, which processes the packets sent from the service board and sends the reverse packets to the service board which processes and sends the reverse packets to the external devices through the interface unit; wherein
    the service board comprises:
    a flow table sending unit, which sends a flow table to each interface and/or to the main CPU to indicate that the service board will process the packets and the corresponding reverse packets.

9. The system of claim 8, wherein the service board further comprises:
an identification sending unit, which saves information of the service board in extension data fields of the packets that will be sent to the main CPU.

10. The system of claim 9, the main CPU comprises: a service board acquisition unit, which translates the information of the service board in the extension data fields of the received packets and acquires the service board that will process the reverse packets.

11. The system of claim 8, wherein the main CPU comprises:
a service board acquisition unit, which
searches the flow table of each interface, and / or the flow table sent to the main CPU and acquires the service board that will process the reverse packets.

12. A packet processing system, which applies to a high-performance and scalable flow processing system architecture and comprises:
a main CPU, which sends packets to a service board for processing when intending to send the packets to external devices, and receives reverse packets from the service board;
at least one service board, which processes the packets from the main CPU and sends the processed packets to the external device through an interface, and performs security processing for the reverse packets from an interface and sends the processed reverse packets to the main CPU;
the interface, which sends the processed packets from the service board to the external devices, and sends the reverse packets from the external devices and destined for the main CPU to the service board; wherein each service board comprises:
a flow table sending unit, which sends a flow table to each interface to indicate that the service board will process the packets and the corresponding reverse packets.

13. The system of claim 12, wherein the interface comprises:
a service board sending unit, which acquires the service board that will process the reverse packets by searching the flow table when receiving the reverse packets from external devices.

* * * * *